(12) United States Patent
Schouest et al.

(10) Patent No.: US 7,520,553 B1
(45) Date of Patent: Apr. 21, 2009

(54) HEAVY-DUTY RUBBER AEROSOL AND METHOD

(75) Inventors: Bryan Schouest, Metairie, LA (US); Harrison M. Weber, Baton Rouge, LA (US)

(73) Assignee: Brian L. Schouest, Metairie, LA (US)

( * ) Notice: Subject to any disclaimer, the term of this patent is extended or adjusted under 35 U.S.C. 154(b) by 369 days.

(21) Appl. No.: 11/347,015

(22) Filed: Feb. 3, 2006

Related U.S. Application Data

(60) Provisional application No. 60/649,675, filed on Feb. 3, 2005.

(51) Int. Cl.
B60R 13/01 (2006.01)
(52) U.S. Cl. .................. 296/39.1; 296/39.2; 427/387
(58) Field of Classification Search .............. 296/39.1, 296/39.2; 427/388.1, 387
See application file for complete search history.

(56) References Cited

U.S. PATENT DOCUMENTS

| | | | |
|---|---|---|---|
| 4,364,145 A | 12/1982 | Jones et al. | |
| 4,692,382 A | 9/1987 | Schmitt et al. | |
| 5,063,084 A | 11/1991 | Nelson | |
| 5,814,398 A | 9/1998 | Kronz et al. | |
| 5,925,466 A | 7/1999 | Burton | |
| 6,126,999 A | 10/2000 | Tomasino et al. | |
| 6,431,629 B1 | 8/2002 | Emery | |
| 2002/0098366 A1* | 7/2002 | Gou et al. | 428/457 |
| 2003/0096123 A1 | 5/2003 | Yaeger | |
| 2003/0118739 A1 | 6/2003 | Li et al. | |
| 2003/0224198 A1 | 12/2003 | Cuyler et al. | |
| 2004/0005413 A1 | 1/2004 | Li et al. | |

FOREIGN PATENT DOCUMENTS

SU         246753 A  *  2/1968

* cited by examiner

*Primary Examiner*—Jason S Morrow
(74) *Attorney, Agent, or Firm*—Garvey, Smith, Nehrbass & North, L.L.C.; Seth M. Nehrbass

(57) ABSTRACT

A temporary rubber coating compound, which is preferably sprayed from a can, can be used as a protective coating for vehicle surfaces against insects and other debris on the front of vehicles and can be used as a protective coating in truck beds before a plastic drop-in truck liner is installed. A method of protecting a vehicle includes forming a protective coating on the vehicle using this rubber coating compound.

26 Claims, 2 Drawing Sheets

HEAVY-DUTY RUBBER AEROSOL AND METHOD

CROSS-REFERENCE TO RELATED APPLICATIONS

Priority of U.S. Provisional Patent Application Ser. No. 60/649,675, filed 3 Feb. 3, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a rubber coating. More particularly, the present invention relates to a rubber coating composition, preferably in aerosol spray form.

2. General Background of the Invention

Love bugs and other bugs get stuck to the front of vehicles in areas where they occur in great numbers during certain times. It is often difficult to remove the bugs from the vehicles and damage to the painted surfaces will occur if these bugs are not removed. Also, rocks, sand and other debris during driving can affect the frontal and side painted surfaces by chipping and scratching these surfaces of vehicles.

Currently drop-in plastic truck bed liners are often included in pickup trucks at automobile dealerships. However, manybuyers do not want the liners, as they sometimes scratch the paint of the pickup truck bed and cause the bed to rust. Buyers of pickup trucks frequently request that the liners be removed. This unfortunately often causes scratching of the paint of the bed.

Drop-in bed liners:

are usually less expensive than spray-in bed liner;

distribute load weight more evenly;

are ribbed to protect against shock loads and road bumps;

are U.V. resistant which eliminates fading;

are removable at will thereby giving the truck owner the option of having a bed liner or not.

Permanent spray-on truck bed liners are available which are epoxies and are not removable. Thus, some people do not wish to install them in their truck beds. These permanent liners do protect against rust but do not prevent dents to the bed of the truck surface as do plastic drop-in bed liners.

In order to prepare a pick up truck cargo box for a spray-in bed liner, the entire painted surface of the cargo box must be scuffed by sandblasting and removing the factory finish. Further, spray-in bed liners do not protect the cargo box surface from high impact shocks such as shovels, bricks, lumber and the like which can result in dents and removal of the spray in material itself. When this happens, the metal surface is exposed and rust will result. Permanent spray-in bed liners, over time, may also fade due to U.V. radiation from the sun and result in a chalky, faded color look.

The following U.S. Patent Documents are incorporated herein by reference:

U.S. Pat. Nos. 4,364,145; 5,063,084; 6,431,629; 4,692,382; 5,814,398; 5,925,466; 6,126,999;

U.S. Patent Publication Nos.: 2003/0096123; 2003/0118739; 2003/0224198; 2004/0005413.

U.S. Pat. No. 6,126,999 discloses spraying a rubber-like coating onto the bed of a pickup truck to cover the metal surface.

U.S. Pat. No. 5,925,466 discloses troweling a flexible rubber coating onto a metal truck bed to form a liner.

U.S. Publication No. 2003/0118739 discloses spraying a coating onto a truck bed to form a liner.

U.S. Pat. No. 5,814,398 discloses a method of spraying a polyurethane coating onto a truck bed to form a liner.

BRIEF SUMMARY OF THE INVENTION

The present invention includes a neoprene rubber spray which is used to provide a protective coating on the front of vehicles or as a protective measure to prevent rusting of the metal truck bed by drop-in plastic truck bed liners.

This soft spray-on rubber will stand as a temporary barrier to protect these painted surfaces from damaging elements. This product is sprayed on and able to be removed by peeling the product from the surface applied with no adverse consequences.

The present invention preferably uses an aerosol rubber spray. Most undercoating has rubber as one of the binders. However, the use of the rubber to protect truck beds from abrasion and rust is unique.

The coating of the present invention is relatively easily removable. It is also mostly clear and the truck owner can tell if rust has occurred. The preferred formula includes hexane, acetone, Kraton 1652 rubber (made by Shell Chemical, Norco, La.), 1000 cst silicone oil, and A/70 propellant. The silicone makes it easier to peel off. The acetone evaporates rapidly, causing the bubbles. The product is also unique in that it is spongy and this serves as a sound deadener. Regular undercoating does dot have these insulating bubbles. The rubber is substantially completely hydrophobic and repels water. The rubber is preferably styrene-blocked and is preferably stable against UV sunlight. The rubber also protects against abrasion from the plastic liner. This is essentially a truck bed liner insulation/primer. The cured rubber is substantially totally non-toxic and biodegradable. This is a relatively easily removable, insulating, binding, water-displacing preparation for plastic truck bed liners.

Rubber coatings of the present invention can be applied (preferably by spraying) on the front of a vehicle. When the coating is full of insects (such as love bugs) or other debris, one can simply peel it off and apply a new coating.

The present invention includes a spray-on heavy-duty rubber aerosol which can be used for love bug season, then peeled off. Preferably, this coating is clear, and air dries to thick rubber.

One can use this coating on pickup truck beds prior to installing a plastic drop-in bed liner in a truck bed.

The method of protecting truck beds of the present invention preferably includes spraying the liner, but also includes applying rubber with a roller.

The present invention includes a spray-on heavy-duty rubber aerosol and a method of using the rubber to protect cars from bugs and road debris and to protect truck beds from truck liners.

DETAILED DESCRIPTION OF THE INVENTION

Figure 1:
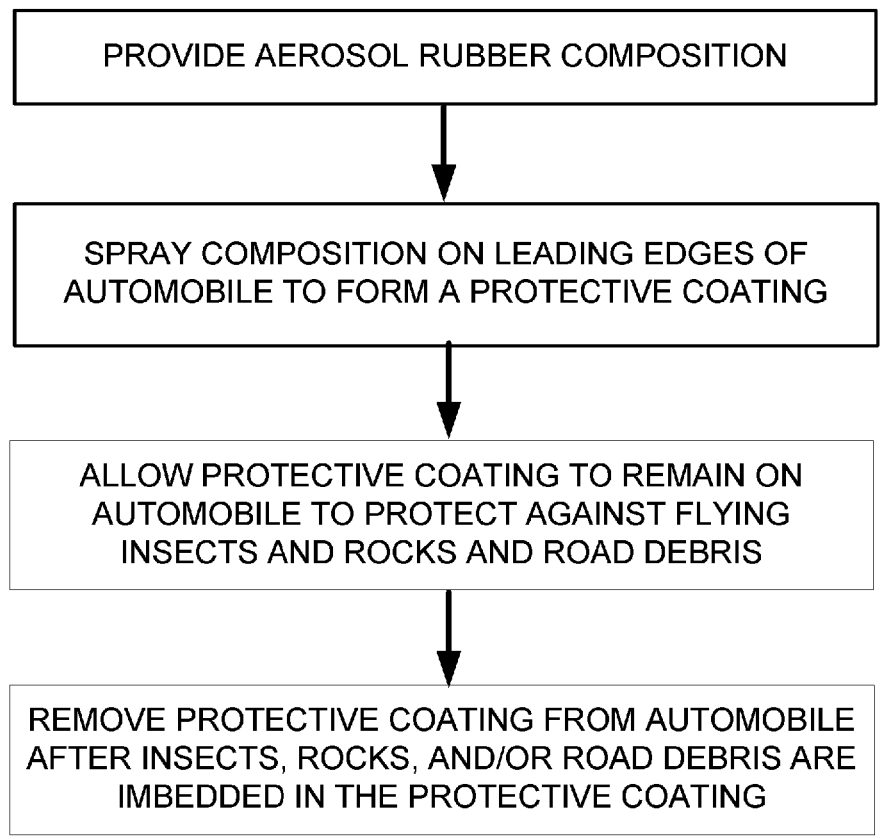
FIG. 1 is a flow chart showing a first method of the present invention.
Figure 3:
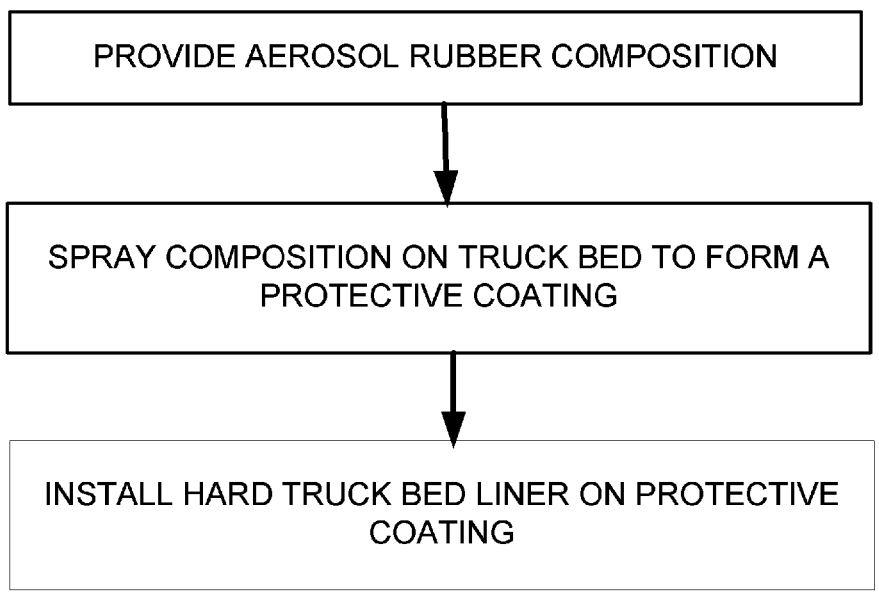
FIG. 3 is a flow chart showing a second method of the present invention.
Figure 2:
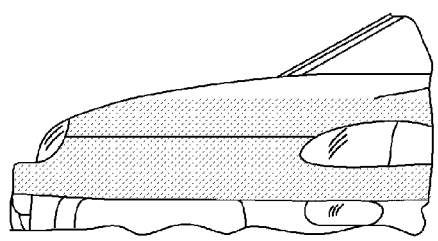
FIG. 2 shows a protective coating of the present invention on the leading edge of an automobile.
Figure 4:
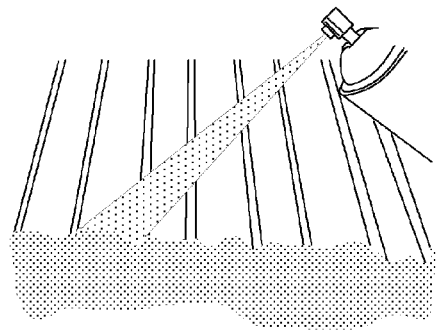
FIG. 4 shows a coating of the present invention being sprayed onto a truck bed.
Figure 5:
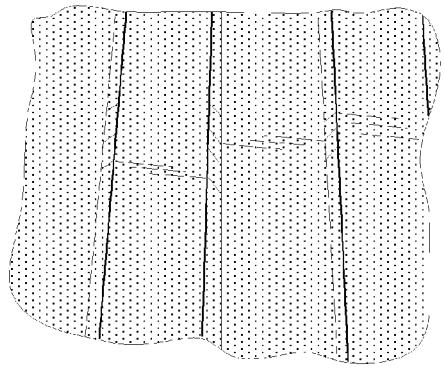
FIG. 5 is a detail showing a coating of the present invention on a truck bed.
Figure 6:
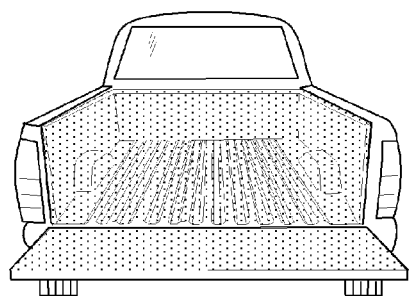
FIG. 6 shows a coating of the present invention on a truck bed.
Figure 7:
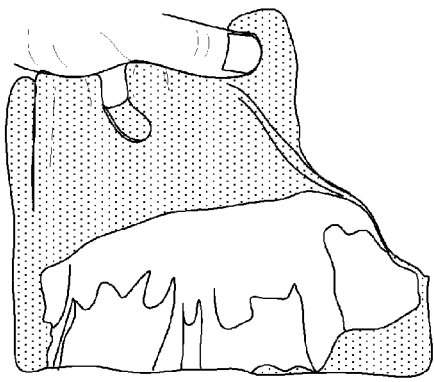
FIG. 7 shows a coating of the present invention being removed from a truck bed.

The present invention includes a neoprene spray which is used to provide a protective coating on the front of vehicles or a truck bed liner. This product can have bubbles or no bubbles. insulating bubbles. The rubber is substantially completely hydrophobic and repels water. The rubber is preferably styrene-blocked and is preferably stable against UV sunlight. The rubber also protects against abrasion from the plastic liner. This is essentially a truck bed liner insulation/primer. The cured rubber is substantially totally non-toxic and biodegradable. This is a relatively easily removable, insulating, binding, water-displacing preparation for plastic truck bed liners.

Rubber coatings of the present invention can be applied (preferably by spraying) on the front of a vehicle. When the coating is full of insects (such as love bugs) or road debris, one can simply peel it off and apply a new coating.

The present invention includes a spray-on heavy-duty rubber aerosol which can be used for love bug season, then peeled off. Preferably, this coating is clear, and air dries to thick rubber.

One can use this coating on pickup truck beds prior to installing a plastic drop-in bed liner in a truck bed.

The method of protecting truck beds of the present invention preferably includes spraying the liner, but also includes applying rubber with a roller.

The present invention includes a spray-on heavy-duty rubber aerosol and a method of using the rubber to protect cars from bugs and truck beds from truck liner.

TABLE I

Composition for protectant for automobiles against flying insects, rocks, and road debris, and for forming a temporary truck liner

| Preferred Chemical (alternatives) | Function | Percentage by Weight |
|---|---|---|
| hexane (pentane, heptane, and toluene) | solvent | Preferably about 15-40<br>More preferably about 20-35<br>Most Preferably about 27-29<br>About 28, for example |
| acetone (methyl ethyl keytone, and cyclohexanone) | solvent | Preferably about 5-35<br>More preferably about 10-30<br>Most Preferably about 27-29<br>About 16.5, for example |
| Kraton 1652 rubber (Kraton 1101 rubber and SOL-T-190 (thermoplastic linear styrene isoprene rubber)) | neoprene, styrene-block coating | Preferably about 5-45<br>More preferably about 10-30<br>Most Preferably about 15-17<br>About 16, for example |
| A/70 propellant (dimethyl ether, CO2, and A/46) | propellant | Preferably about 10-50<br>More preferably about 15-40<br>Most Preferably about 24-26<br>About 25, for example |
| 1000 cst silicone oil (200-2000 cst silicone oil, 350 cst-10,000 cst silicone oil) | release agent (allows coating to be peeled off easily (could be omitted in truck bed applications) | Preferably about 0.01-10<br>More preferably about 0.1-5<br>Most Preferably about 0.2-0.6<br>About 0.2, for example |

The present invention preferably uses an aerosol rubber spray. Most undercoating has rubber as one of the binders. However, the use of the rubber to protect truck beds from abrasion and rust is unique.

The coating of the present invention is preferably relatively easily removable. It is also mostly clear so the truck owner can tell if rust has occurred. The silicone makes it easier to peel off. The acetone evaporates rapidly, causing the bubbles. The product is also unique in that it is spongy and this serves as a sound deadener. Regular undercoating does dot have these The present invention includes providing an aerosol rubber composition (such as that disclosed in the table above) to protect against damage to automobile surfaces from flying insects, rocks, and road debris, applying the composition to an automobile to create a protectant coating on leading edges of the automobile (but preferably not on the windshield), allowing the coating to protect against flying insects, rocks, and debris for paint protection, and peeling the composition off of the automobile after insects, rocks, and/or debris are imbedded in the coating.

The present invention includes providing an aerosol rubber composition (such as that disclosed in Table 1 above) to protect against damage to truck bed surfaces from truck bed liners, applying the composition to a truck bed surface to create a protectant coating, and installing a plastic truck bed liner over the coating.

TABLE 2

Composition for relatively permanent protectant for truck beds or other applications

| Preferred Chemical (alternatives) | Function | Percentage by Weight |
|---|---|---|
| hexane (pentane, heptane, and toluene) | solvent | Preferably about 15-40 More preferably about 20-35 Most Preferably about 27-29 About 28, for example |
| acetone (methyl ethyl keytone, and cyclohexanone) | solvent | Preferably about 5-35 More preferably about 10-30 Most Preferably about 27-29 About 16.5, for example |
| Kraton 1652 rubber (Kraton 1101 rubber and SOL-T- 190 (thermoplastic linear styrene isoprene rubber)) | neoprene, styrene-block coating | Preferably about 5-45 More preferably about 10-30 Most Preferably about 15-17 About 16, for example |
| A/70 propellant (dimethyl ether, $CO_2$, and A/46) | propellant | Preferably about 10-50 More preferably about 15-40 Most Preferably about 24-26 About 25, for example |

The present invention includes providing an aerosol rubber composition (such as that disclosed in Table 2 above) to protect against damage to truck bed surfaces from truck bed liners, applying the composition to a truck bed surface to create a relatively permanent protectant coating (that it, it is harder to remove a coating made with the compostion of Table 2 than to remove one made with the composition of Table 1), and installing a plastic truck bed liner over the coating.

Kraton 1101 is a trademark for butadiene rubber

Kraton 1652 is a trademark for neoprene, styrene-block rubber

SOL-T-190 is a trademark for europrene rubber, also known as thermoplastic linear styrene isoprene rubber A/46 is a trademark for a propane/butane blend propellant yielding 46 psi @ 70 degrees F.

A/70 is a trademark for a propane/butane blend propellant yielding 70 psi @ 70 degrees F.

The aerosol rubber coating of the present invention helps to protect a vehicle's surface from bug and rock impacts thus protecting the vehicle's finish.

The aerosol rubber coating of the present invention can add scratch and impact protection when applied to a toolbox.

The aerosol rubber coating of the present invention can be applied to metal stairs to promote slip resistance.

The aerosol rubber coating of the present invention is the only all-purpose Neoprene rubber aerosol coating known to the inventors designed to protect metal and other non-porous surfaces from rust, impacts and abrasion.

The aerosol rubber coating of the present invention can act as a protective coating for industrial and commercial applications.

The aerosol rubber coating of the present invention can act as a protective coating against bug and rock impacts on automotive surfaces.

The aerosol rubber coating of the present invention can provide tool and toolbox protection.

The aerosol rubber coating of the present invention can be used on snowplow blades to avoid rust in the off-season.

The aerosol rubber coating of the present invention can act as an anti-slip agent on aluminum and metal boat floors.

The aerosol rubber coating of the present invention can act as an anti-corrosion agent on automotive battery terminals.

The aerosol rubber coating of the present invention can act as an anti-corrosion agent on boat trailers.

The aerosol rubber coating of the present invention can act as a protective coating for glass and other delicate surfaces.

The skin-safe and temperature-resistant spray of the present invention creates an airtight waterproof barrier while the insulating bubbles provide added impact protection to the treated surface. The aerosol rubber coating of the present invention is easily removed after application, if desired, by merely peeling off the Neoprene sheet by hand. Patching is simple by reapplying a new layer over an existing layer. The aerosol rubber coating of the present invention is preferably manufactured in multiple colors, including at least black, white, and red, to either match the color of an automobile or to provide a striking contrast to the paint color.

Instructions for application of the composition of the present invention: ensure the surface to be protected is clean and dryby removing all loose debris, dirt, dust and moisture;

mask off sections not to be coated by the aerosol rubber coating of the present invention; apply the aerosol rubber coating of the present invention in the shade at cool temperatures, if possible out of direct wind in a well ventilated area;

shake the container well and spray approximately 6-10 inches form surface being treated using overlapping layers until the entire surface is covered by preferably a minimum of ⅛ inch build.

Typically, the coating is dry to the touch in about 15 minutes. It is best to allow 90 minutes for maximum product benefits.

The aerosol rubber coating of the present invention is safe, easy and simple to use. It is preferably sprayed onto a clean and dry non-porous surface. The aerosol rubber coating of the present invention preferably air dries. The coating is usually dry to the touch in about 15 minutes and will normally fully cure at 90 minutes. The aerosol rubber coating of the present invention can provide rust, abrasion and impact protection that will last for years to come on any hard surface.

If removal of the aerosol rubber coating of the present invention is neccessary, simply peel the protective Neoprene coating up by hand to expose the intact surface underneath.

The aerosol rubber coating of the present invention is not designed for use on glass such as windshields while driving as vision will be obscured. The aerosol rubber coating of the present invention is not designed for use on porous surfaces such as wood, fabrics and some plastics as surface discoloration may occur. If a surface is being coated with the aerosol rubber coating of the present invention for the first time, it is best to test a hidden area before general use.

To remove a coating of the present invention, one can peel up an edge of the film from the surface and pull up entire sections as desired. After removing, the coating can be disposed of in a trash bin. The coating can then be reapplied if desired.

The coating of the present invention typically has:

a melt point of around 446 degrees F.;

a hardness of about 69 Shore A;

a tensile strength of about 4600 psi;

elongation at break of about 880%;

specific gravity of about 0.94;

diblock content of about 16%.

The aerosol rubber coating of the present invention is the only neoprene rubber aerosol known to the inventors guaranteed to help protect new truck beds from chafing and resulting rusting from the use of drop-in bed liners. The aerosol rubber coating of the present invention also helps in preventing older truck beds from further damage by application of the aerosol rubber coating of the present invention after proper repair of any existing damage.

The aerosol rubber coating of the present invention is an easy to use aerosol neoprene rubber spray used to prepare painted metal and composite truck beds prior to installation of a drop-in bed liner. The skin-safe and temperature-resistant spray creates an airtight, waterproof seal to the truck bed surface. The insulating bubbles in the aerosol rubber coating of the present invention provide soundproofing and cushion to the sidewalls and bed of the cargo box. The aerosol rubber coating of the present invention is easily removed after application, if desired, by merely peeling off the noeprene sheet by hand. Patching is simple by reapplying a new layer onto an existing layer.

Drop-in bed liners provide light truck owners superior cargo box paint scratch and dent protection caused by high impact loading, sharp edged materials and shifting loads. Proper cargo box preparation with the aerosol rubber coating of the present invention prior to installation of the drop-in liner results in never-before-available cargo box rust protection.

When sprayed from its aerosol container, the aerosol rubber coating of the present invention adheres to the cargo box surface and leaves an impervious barrier between the bed liner and the cargo box painted surface. The tough neoprene rubber coating keeps moisture due to rain, snow, ice and humidity away from the metal truck bed and inhibits rusting. The millions of tiny bubbles in the aerosol rubber coating of the present invention cushion the bed liner from the truck bed surface and prevent paint dislocation on the truck bed.

The aerosol rubber coating of the present invention is quickly applied and may be removed by anyone merely by tearing it away from the truck bed surface. When properly installed, the aerosol rubber coating of the present invention provides years of continuous protection and when removed rewards the truck owner with a factory finish look.

The present inventors believe that no pick up truck should be without a drop-in bed liner and no drop-in liner should be installed without prior application of the aerosol rubber coating of the present invention.

If one wishes to use less of the product of the present invention before installing a drop-in bed liner, one can spray only the surfaces in direct contact with the drop-in bed liner such as the tops of the bed rails.

The coating of the present invention can provide permanent protection for the vehicle's load-carrying surface, yet can be easily removed when desired. The coating of the present invention quickly and easily sprays on. A ⅛" thick coating protects and insulates the truck bed from damage from a liner. The coating is beneficial even if it is as thin as 0.03". A coating over about 0.9" is really not much better than a thinner coating and is wasteful of the product.

Typically, about 5% of the coating is hollow bubbles, though usually more would be better.

To apply the coating of the present invention, shake the can, spray about 6-8 inches away from the surface to be coated, preferablyin two thin layers, about ¹⁄₃₂" each, with as many bubbles as possible (the coating shrinks slightly as it dries).

The coating of the present invention is easily removable by hand when desired.

The present invention is commercially available at www.diamondite.com (which is incorporated herein by reference) as Diamondite® Spray Gard and Diamondite® Truck Bed Spray Gard.

Additional uses of the coating of the present invention include:

gutter leak preventative and patch;

house water proofing;

when applied on wood in stalls, it discourages horses from chewing on the wood;

corrosion protection for bolts;

anti-slip agent on floors, steps, etc.;

flashing for roofs;

repair of garden hoses.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An aerosol spray rubber composition for use as a temporary coating on vehicles comprising:
   (a) a first solvent;
   (b) a second solvent;
   (c) a rubber coating composition;
   (d) a propellant; and
   (e) a release agent, wherein:
   the first solvent is from the group consisting of hexane, pentane, heptane, and toluene;
   the second solvent is from the group consisting of acetone, methyl ethyl keytone, and cyclohexanone;
   the coating composition is from the group consisting of neoprene styrene-block rubber, butadiene rubber, and europrene rubber;

the propellant is from the group consisting of a propane/butane blend propellant yielding 70 psi @ 70 degrees F., dimethyl ether, $CO_2$, and a propane/butane blend propellant yielding 46 psi @ 70 degrees F.; and the release agent is from the group consisting of 1000 cst silicone oil, 200-2000 cst silicone oil, 350 cst silicone oil, and 10,000 cst silicone oil.

2. The spray composition of claim 1, wherein:

the first solvent comprises hexane;

the second solvent is from the group consisting of acetone;

the coating composition is from the group consisting of neoprene, strene-block rubber;

the propellant is from the group consisting of the propane/butane blend propellant yielding 70 psi @ 70 degrees F.

3. The spray composition of claim 1, including by weight
(a) about 15-40% of the first solvent;
(b) about 5-35% of the second solvent;
(c) about 5-45% of the coating composition; and
(d) about 10-50% of the propellant.

4. The spray composition of claim 1, including by weight
(a) about 15-40% of the first solvent;
(b) about 5-35% of the second solvent;
(c) about 5-45% of the coating composition;
(d) about 10-50% of the propellant; and
(e) about 0.01-10% of the release agent.

5. The spray composition of claim 1, including by weight
(a) about 20-35% of the first solvent;
(b) about 10-30% of the second solvent;
(c) about 10-30% of the coating composition;
(d) about 15-40% of the propellant.

6. The spray composition of claim 1, including by weight:
(a) about 20-35% of the first solvent;
(b) about 10-30% of the second solvent;
(c) about 10-30% of the coating composition;
(d) about 15-40% of the propellant; and
(e) about 0.1-5 of the release agent.

7. The spray composition of claim 1, including by weight:
(a) about 27-29% of the first solvent;
(b) about 27-29% of the second solvent;
(c) about 15-17% of the coating composition;
(d) about 24-26% of the propellant.

8. The spray composition of claim 1, including by weight:
(a) about 27-29% of the first solvent;
(b) about 27-29% of the second solvent;
(c) about 15-17% of the coating composition;
(d) about 24-26% of the propellant; and
(e) about 0.2-0.6 of the release agent.

9. A hand-held aerosol can including the composition of claim 1.

10. The can of claim 9, having a capacity of 18-23 fluid ounces.

11. A method of protecting a vehicle, comprising:
providing the spray composition of claim 1;
spraying the composition to form a protective coating on the vehicle.

12. The method of claim 11, wherein the protective coating is on the front of a vehicle to protect it from insects and/or rocks and/or road debris.

13. The method of claim 12, wherein the protective coating is removed from the vehicle after insects and/or rocks and/or road debris are imbedded in the coating.

14. The method of claim 11, wherein the protective coating is on a truck bed and is installed prior to installing a truck bed liner, to help protect the truck bed from abrasions caused by the truck bed liner.

15. The method of claim 14, further comprising installing a hard truck bed liner on the truck bed.

16. A protective coating formed by the method of claim 11.

17. A truck liner made with the spray composition of claim 1.

18. A protective coating for protecting a vehicle, formed by applying to the vehicle a coating made with the spray composition of claim 1.

19. The invention of claim 18, wherein the protective coating is an undercoat for a truck bed liner.

20. The invention of claim 18, wherein the protective coating is applied to the front of a vehicle to protect against insects and/or rocks and/or road debris, and wherein the coating substance further comprises a release agent.

21. The invention of claim 18, wherein the coating has a thickness of about 0.03-0.9".

22. The invention of claim 21, wherein the coating has a thickness of about 0.06-0.5".

23. The invention of claim 21, wherein the coating has a thickness of about 0.1-0.3".

24. The invention of claim 18, wherein approximately 1-25% by volume of the coating is made of hollow bubbles.

25. The invention of claim 24, wherein approximately 2-20% by volume of the coating is made of hollow bubbles.

26. The invention of claim 25, wherein approximately 3-15% by volume of the coating is made of hollow bubbles.

* * * * *